INVENTOR.
DAVID N. JUDELSON

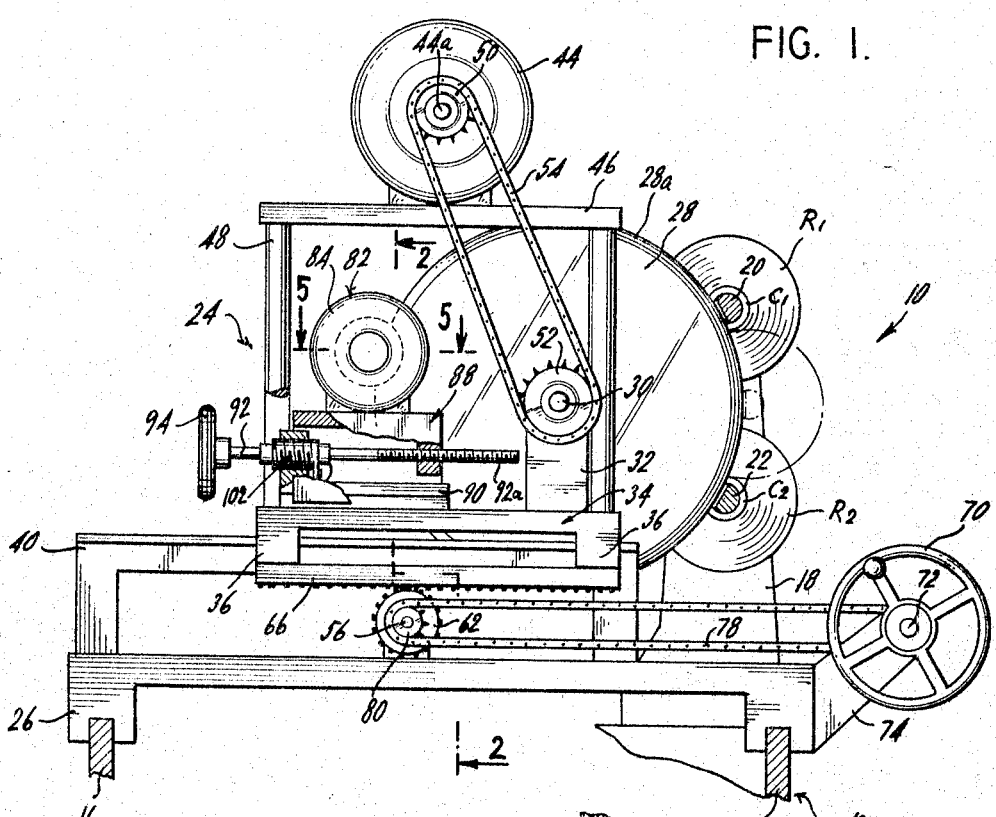

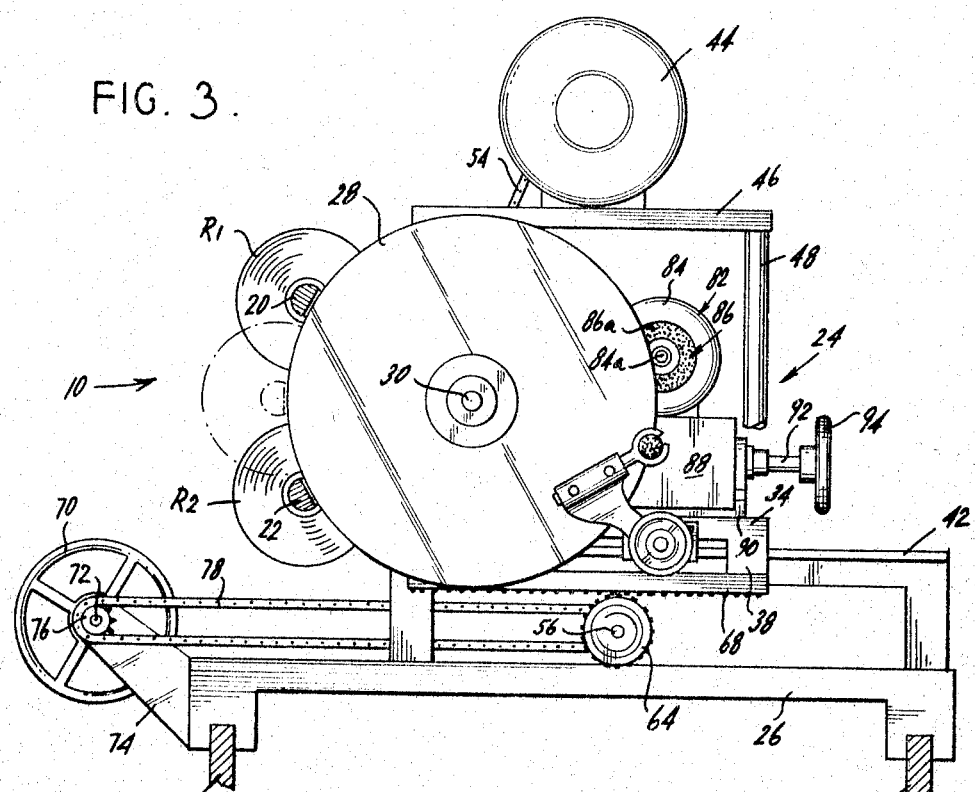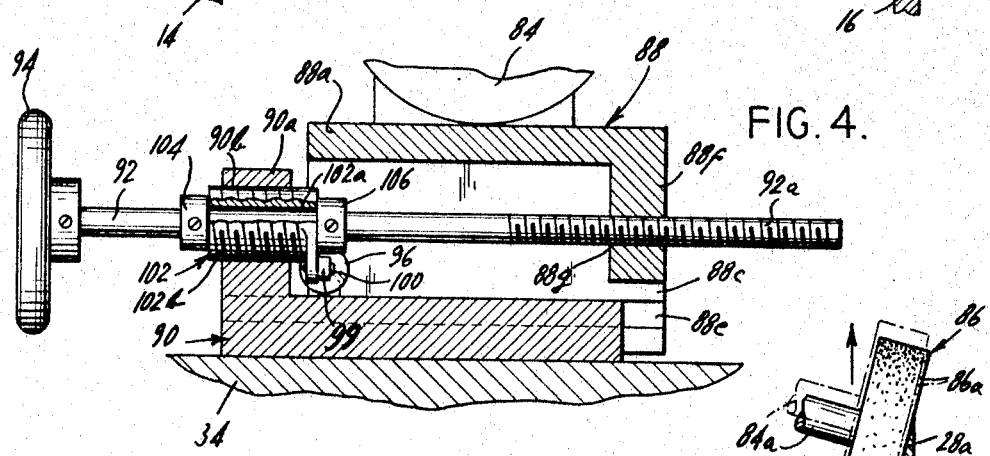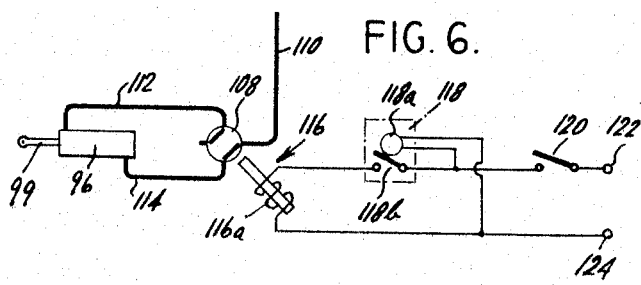

United States Patent Office 3,320,841
Patented May 23, 1967

3,320,841
ROTARY KNIFE MACHINE FOR CUTTING
SINGLE OR MULTIPLE ROLLS
David N. Judelson, New York, N.Y., assignor to Oscar
I. Judelshon Inc., Jersey City, N.J., a corporation of
New York
Filed Apr. 26, 1965, Ser. No. 450,813
11 Claims. (Cl. 82—49)

The present invention relates generally to machines for cutting material, such as cloth, paper and the like, and in particular to improved grinding or sharpening mechanisms in rotary knife cutting machines of the types which are suitable for simultaneously cutting single or plural rolls of material into corresponding plural strips or tapes.

Rotary knife cutting machines of the type which enable the manual or automatic cutting of one or more rolls of material into a number of strips of cuts of a prescribed width are generally known in the trade and find widespread application, particularly for cutting straight and bias cut fabrics into relatively narrow tapes. Typical of the pror art machines are those described and illustrated in U.S. Patents Nos. 2,457,310 of Dec. 28, 1948; 3,128,659 of Apr. 14, 1964; and 3,161,097 of Dec. 15, 1964, all assigned to the assignee of the instant application. Such machines include a frame upon which are supported one or more stationary shafts for receiving a corresponding number of rolls of material wound on respective cores. Each roll of material is rotated about the longitudinal axis of its stationary shaft by means of a chuck which engages one end of the roll and is driven from an appropriate variable speed drive. A high speed rotary knife is mounted on a knife carrier which moves toward and away from the one or more stationary roll-supporting shafts to move the rotary knife through a cutting cycle. The knife carrier in turn is mounted on a movable carriage which has an indexing mechanism selectively engageable with the frame of the machine such that the carriage may be moved stepwise through a prescribed traversing stroke for moving the rotary knife into successive cutting positions along the length of the machine toward the chucked end of the one or more rolls of material. After each stepwise advance of the knife carriage, the rotary knife moves inwardly toward the one or more roll-supporting shafts, either by virtue of operator actuation or on an automatic basis, such that the rotary knife is effective in a cutting plane substantially at right angles to the longitudinal axes of the rolls to shear transversely through the rolls.

Such machines are capable of handling rolls having varying diameters; and for such varying diameters, a greater or lesser portion of the forward or cutting stroke of the high speed rotary knife in its cutting cycle will be employed. Due to the large number of cuts which are made and the fact that it is frequently necessary to cut materials having an abrasive nature, it is necessary to make provision for sharpening of the peripheral cutting edge of the rotary knife between successive cutting cycles. To this end, it is conventional to incorporate a grinder or sharpener which is mounted on the indexable carriage of the cutting machine and is arranged to engage the peripheral cutting edge of the rotary knife to maintain the sharpness thereof. The grinding or sharpening mechanism is mounted on the carriage in position to engage the rotary knife when it is manually or automatically moved to the retracted position withdrawn from the roll-supporting shaft or shafts. It is also conventional, as disclosed in U.S. Patent No. 3,161,097, to adjustably mount the sharpening or grinding mechanism on the knife carriage such that the grinding mechanism may be periodically adjusted relative to the knife to assure that there will be well defined and sharpened cutting edges notwithstanding the continuous diameter reduction of the rotary knife incident to such sharpening.

When such machine is operative on a manual basis, the machine operator allows the knife to remain in the retracted position for a sufficient period of time to enable the cutting edge of the rotary knife to be resharpened. When such machine is operated on an automatic basis, the control therefor is programmed such that the rotary knife dwells in the retracted position for a sufficient period of time to enable the grinding or sharpening mechanism to recondition the cutting edge. Notwithstanding the ability to operate on an automatic basis and facility to cut through multiple rolls simultaneously, there exists a need for improvements which still further reduce the time required to make successive cuts with this type of equipment. In particular, it would be advantageous if it were possible to eliminate the need for the rotary knife to dwell in the retracted position to enable the grinding or sharpening mechanisms to act on the cutting edge thereof.

Broadly, it is an object of the present invention to provide an improved rotary knife cutting machine which realizes one or more of the aforesaid objectives. Specifically, it is within the contemplation of the present invention to provide a grinding mechanism for a rotary knife cutting machine which eliminates the need for the rotary knife to dwell in a retracted position for a grinding or sharpening interval thereby effectively decreasing the overall time required for successive cutting cycles.

It is a further object of the present invention to provide a grinding mechanism in a rotary knife cutting machine which enables the programmed sharpening of the rotary cutting knife simultaneously with the movement of the knife through its required cutting cycle. Advantageously, the time required for the entire cutting cycle, or any preselected portion thereof, is available for the grinding or sharpening of the rotary cutting knife.

In accordance with an illustrative embodiment demonstrating objects and features of the present invention there is provided a rotary knife cutting machine which comprises a frame having roll-supporting means adapted to receive at least one roll of material to be slit or cut and a cutting mechanism including a rotary knife mounted on the frame for movement through a cutting cycle relative to the roll-supporting means. In accordance with the present invention, the grinding mechanisms are mounted on the cutting mechanisms in operative relation to the rotary knife such that the grinding mechanisms will move with the rotary knife and sharpen the same. Provision is made for periodically moving the grinding mechanisms out of operating relation to the rotary knife such that the grinding mechanisms will continue to move with the rotary knife, but will be ineffective to sharpen the same. Advantageously, the control may be programmed to provide for grinding of the rotary knife during all or any selected portion of the elapsed time for the cutting cycle which will be determined in the first instance by the type of the material being cut and other parameters as is generally understood by those skilled in the art.

As a feature of the invention, provision is made for adjusting the initial position of the grinding mechanisms relative to the roll-supporting means in dependence upon the diameter of the rotary knife such that the machine may be compensated for knife wear and corresponding diameter reduction in the rotary knife.

The above brief description as well as further objects, features and advantages of the present invention will be more fully appreciated by reference to the following detailed description of several presently preferred, but nonetheless illustrative embodiments in accordance with the present invention, when taken in conjunction with the accompanying drawings, wherein:

FIG. 1 is a side elevational view, with parts broken away and sectioned, of a rotary knife cutting machine embodying features of the present invention;

FIG. 2 is a sectional view taken substantially along the line 2—2 of FIG. 1 and looking in the direction of the arrows, showing details of the mounting arrangements for the rotary knife and the grinding mechanisms;

FIG. 3 is a side elevational view similar to FIG. 1, but taken from the opposite side of the rotary knife showing further details of the present machine;

FIG. 4 is a sectional view, on an enlarged scale, taken substantially along the lines 4—4 of FIG. 2 and looking in the direction of the arrows, showing details of the mounting arrangement for the grinding mechanism;

FIG. 5 is a fragmentary elevational view, with parts in section, showing in the full lines the operative or engaging position for the grinder wheel relative to the rotary knife and in broken lines the inoperative or retracted position thereof;

FIG. 6 is a schematic and diagrammatic view of a typical control for the present machine;

Figure 7:
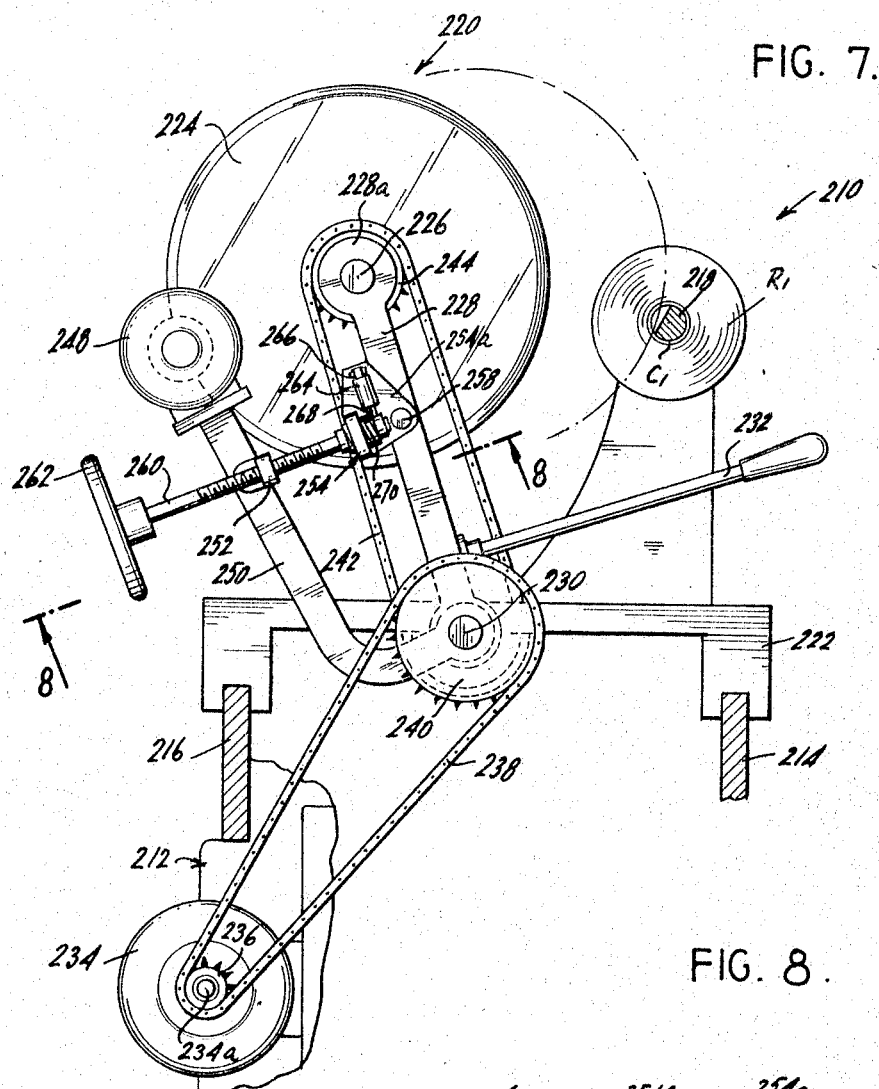
FIG. 7 is a side elevational view, with parts broken away and in section, showing a modified rotary knife cutting machine embodying further features of the present invention.

Referring now specifically to the drawings, and in particular to FIGS. 1 to 5 inclusive, there is shown a rotary knife cutting machine, generally designated by the reference numeral 10, which is of the general type illustrated in U.S. Patent No. 3,128,659 and is particularly suitable for the simultaneous cutting of two rolls of material. However, it will be appreciated that the invention finds equal application in a rotary knife cutting machine of the type having a single roll-supporting shaft, as shown in detail in U.S. Patent No. 3,161,097 and as illustrated by the dotted line showings in FIGS. 1 and 3.

The rotary knife cutting machine 10 includes a machine frame 12 having front and rear rails 14, 16 extending between opposite end walls or castings, such as the right end wall or casting 18. Extending longitudinally of the machine frame 12 is a main roll-supporting and turning arrangement which includes a stationary main shaft 20 and an associated rotatable chuck (not shown). The stationary main shaft 20 receives a roll of material $R_1$ which is wound on a core $C_1$, as of cardboard, and is adapted to cut into plural strips of tapes, as is generally understood. In this illustrative embodiment, there is provided an auxiliary roll-supporting and turning arrangement in a common vertical plane with the main shaft 20 and spaced therebelow. The auxiliary arrangement includes a stationary auxiliary shaft 22 likewise having a rotatable chuck (not shown) which is adapted to receive a roll of material $R_2$ wound on a core $C_2$. The details of the roll-supporting and turning arrangements are dispensed with in the interest of brevity. For a detailed description of a typical roll-supporting and turning arrangement, reference may be made to U.S. Patent No. 2,938,733 of May 31, 1960, which is also assigned to the assignee of the instant application.

Mounted on the machine frame 12 is a knife assembly or cutting mechanism, generally designated by the reference numeral 24, which includes a knife carriage 26. The knife carriage 26 is mounted for movement longitudinally of the machine frame on the front and rear longitudinally extending rails 14, 16 and may be indexed through successive longitudinal traversing increments or strokes to bring the knife assembly 24 into successive cutting positions. The knife assembly 24 includes a high speed rotary knife 28 having a peripheral cutting edge 28a which is adapted to penetrate through the multiple plies of the one or more rolls $R_1$, $R_2$ and their respective cores $C_1$, $C_2$. The rotary knife 28 is mounted on a horizontal knife shaft 30 which extends parallel to the main and auxiliary shafts 20, 22. The knife shaft 30 is journalled on appropriate bearings 32, with the knife itself being attached to the knife shaft by an appropriate hub. The knife 28 and the supporting bearings 32 are all mounted on a knife carrier 34 which is movable transversely of the machine frame 12 to reciprocate the knife 28 toward and away from the roll-supporting shafts 20, 22. The knife carrier 34 includes respective pairs of shoes 36, 38 at the opposite sides thereof which engage spaced mounting rails or tracks 40, 42 which in turn are supported on the carriage 26. The rails 40, 42 extend fore and aft of the carriage 38 such that the knife carrier 34 and its associated mechanisms may be moved fore and aft relative to the roll-supporting shafts 20, 22, that is, transversely of the machine frame in the various longitudinally indexed positions of the knife carriage 26.

The knife shaft 30 is driven at the requisite high speed for rotating the rotary knife 28 by a knife motor 44 which is mounted on the knife carrier 34 at a location above the knife shaft 30. Specifically, a motor-mounting plate 46 is supported on spaced posts 48 which are carried on the knife carrier 34, with the motor 44 having its motor shaft 44a in spaced parallel relation to the knife shaft 30. The motor shaft 44a is coupled to the knife shaft 30 by an appropriate driving sprocket and chain arrangement including the drive sprocket 50 mounted on the motor shaft 44a, a driven sprocket 52 mounted on the knife shaft 30 and a chain 54 trained over the sprockets.

The knife carrier 34 and the cutting mechanisms which are mounted thereon are reciprocated through a cutting cycle from a retracted position withdrawn from the roll-supporting shafts 20, 22 to the illustrated forward limit position by any appropriate manual or automatic knife-cycling means. Typical of such appropriate means for moving the knife carrier 34 and the rotary knife 28 through the reciprocating cutting cycle is the illustrated manually-operated pinion drive which is seen to include a pinion shaft 56 disposed below the carrier 34 and extending longitudinally of the machine frame 12 parallel to the main and auxiliary roll-supporting shafts 20, 22. The pinion shaft 56 is journalled on the knife carriage 26 by appropriate bearings 58, 60 (FIG. 2). Outwardly of the bearings 58, 60, the pinion shaft 56 carries respective driven pinions 62, 64 which mesh with carrier-actuating racks 66, 68 secured to the knife carrier 36. The pinion shaft is rotated to advance and retract the knife carrier 34 through the provision of a hand wheel 70 which is mounted on a hand wheel shaft 72 supported on a bracket 74 secured to the forward side of the knife carriage 26. The hand wheel shaft 72 carries an actuating sprocket 76 (see FIG. 3) which is coupled via chain 78 to a sprocket 80 secured on the pinion shaft 56 outwardly of the driven pinion 62 (see FIG. 1).

With the aforesaid arrangement, as is more fully described in U.S. Patent No. 3,128,659, it is possible to reciprocate the high speed rotary knife through its cutting cycle in successive longitudinally index positions of the knife cariage 26. In the machine specifically illustrated herein, such reciprocatory movement is brought about by turning of the hand wheel 70, but it will be appreciated that the same can be done on an automatic basis in accordance with the mechanism disclosed in U.S. Patent No. 3,161,097.

In accordance with the present invention, there are provided grinding or sharpening mechanisms, generally designated by the reference numeral 82, which are mounted on the cutting mechanisms or knife assembly 24 in operative relation to the rotary knife 28 such that the grinding mechanisms 82 will move with the rotary knife 28 and sharpen the same. A programmed control means, as will be more fully described in conjunction with FIG. 6, is provided for periodically moving the grinding mechanisms 82 out of operative relation to the rotary knife 28 such that the grinding mechanisms 82 will continue to move with the cutting mechanisms or knife assembly 24, but will be ineffective to sharpen the rotary knife 28. Specifically, the grinding mechanisms 82 include a grinding motor 84 carrying a grinding wheel 86 on its motor shaft 84a. The grinder motor 84 is in turn mounted on a grinder carrier 88 which is slidably mounted for movement fore and aft of the knife carrier 34 on a mounting track or rail 90. Specifically, and as seen best in FIGS. 2 and 4, the grinder carrier 88 is of inverted U-shaped cross section and includes a bight section 88a which provides a mounting platform for the grinder motor 84 and depending leg sections 88b, 88c provided with inwardly directed guide grooves 88d, 88e which receive opposite dovetailing projections of the mounting rail 90.

Provision is made for initially adjusting the position of the grinder carrier 88 relative to the mounting track or rail 90 such that the planar face 86a of the grinding wheel 86 engages the bevelled cutting edge 28a of the rotary knife 28 for sharpening the same and also enabling readjustment of the normal operative position of the grinding mechanisms 82 as the diameter of the knife 28 decreases incident to sharpening during normal usage. To this end, and as seen best in FIGS. 1 and 4, the grinder carrier 88 is provided with a depending end block 88f which is in spaced end to end alignment with an upstanding end block 90a formed at the remote end of the mounting rail 90. Extending through the end blocks 88f, 90a and fore and aft of the machine (e.g., parallel to the direction of traverse of the knife carrier 34) is a grinder-positioning shaft 92 which extends through the end block 90a and has a threaded end-section 92a in a correspondingly tapped hole 88g in end block 88f. The grinder-positioning shaft 92 carries a hand wheel 94 which is accessible at the rearward side of the knife assembly or cutting mechanisms 24 which may be manually turned to move the grinding mechanisms 82 into the initial operative position wherein the grinding wheel 86 engages the knife 28. Additionally, this adjustment mechanism 92, 94 is employed for periodically moving the grinding mechanisms 82 to an inoperative or retracted position wherein the grinder 86 is out of engagement with the rotary knife 28, as shown by the dotted lines in FIG. 5. As may be appreciated by viewing FIGS. 2 and 5, the grinder motor 84 is slightly canted such that the motor shaft 84a extends at a slight angle to the knife shaft 30 such that the planar face 86a of the grinder 86 will be properly oriented relative to the bevelled cutting edge 28a.

Movement of the grinding mechanisms 82 into and out of operative relation to the rotary knife 28 is accomplished by a pneumatic control which is electrically operated and includes a cylinder 96 pivotally supported at pivot 98 on the mounting rail 90 and extending transversely thereof. The cylinder 96 receives a double-acting piston, with the piston rod 98 thereof being pivotally connected at a pivot 100 to a threaded actuating member 102. The actuating member 102, which is seen best in FIG. 4, is in the form of a cylinder which is provided with a through bore 102a through which the grinder-positioning shaft 92 loosely extends. The actuating member 102 is provided with an external lead screw 102b which is engaged within a corresponding tapped hole 90b in the end block 90a of the mounting rail 90. Disposed at opposite sides of the actuating member 102 in abutting relation to the end faces thereof are respective coupling collars 104, 106 which are secured to the grinder-positioning shaft 92 for transmitting motion from the actuating member 102 to the grinder-positioning shaft and via the grinder carrier 88 to the grinding mechanisms 82 for bringing about relative displacement between the grinder 86 and the knife 28 for periodically backing off the grinding wheel 86 to an inoperative position spaced from the rotary knife 28. In actual practice, the stroke of the cylinder and piston 96, 98 is arranged to rotate the lead screw 100 through approximately ⅛ of a turn which is sufficient to back off the grinder 86 into a non-grinding position.

Various types of controls are suitable for periodically moving the grinder 86 out of operative relation to the rotary knife 28 to disable the sharpening action, yet permit the grinding mechanisms 82 to continue to move with the cutting mechanisms 24. Referring to FIG. 6, one such control is seen to include a four-way solenoid-controlled air valve 108 which has an air input line 110 connected thereto and respective feed lines 112, 114 connected to the opposite sides of the double-acting cylinder and piston 96, 98. The four-way air valve 108 is controlled from the solenoid 116. The energization coil 116a of the solenoid 116 is connected via a conventional timer 118 and master switch 120 to the alternating current line 122, 124. The timer 118 is of the type which includes a motor 118a connected across the lines 122, 124 and which closes a switch 118b after timing out a predetermined and settable time interval. Completion of the energization circuit for the coil 116a is effective to operate the solenoid-controlled air valve 108 which reverses the air supply from air input line 110 to the other side of the double-acting cylinder and piston 96, 98 to bring about a corresponding movement of the grinding mechanisms 82 relative to the cutting mechanisms 24. If, for example, the illustrated position of the control in FIG. 6 corresponds to the operative position of the grinder 86 (see FIG. 5), then porting of line 114 to atmosphere and connection of the air input line 110 to the feed line 112 will cause the cylinder and piston 96, 98 to move the grinder to the inoperative position (see the dotted line showing in FIG. 5).

It will be appreciated from the foregoing that by mounting the grinding mechanisms 82 in so-called piggy back relation to the cutting mechanisms 24 there is no longer a requirement for allowing the cutting mechanisms to dwell in a retracted position to provide for a sharpening interval; and indeed, all or part of the lapsed time which it takes to move the cutting mechanisms through a cutting cycle is available for the sharpening of the rotary knife. By the simple expedient of adjusting a conventional timer, it is possible to program periodic sharpening intervals superimposed upon the normal cutting cycle and thereby retain the required sharpness of the knife without in any way increasing the cutting cycle, and in actuality, bringing about a corresponding decrease in the cutting cycle.

Figure 8:
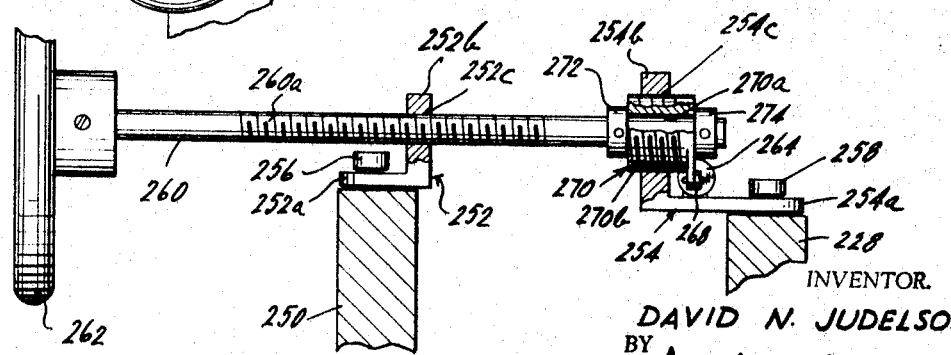
FIG. 8 is a sectional view taken substantially along the line 8—8 of FIG. 7 and looking in the direction of the arrows, showing details of the mounting and adjustment mechanisms associated with the grinder.

Referring now specifically to FIGS. 7 and 8 there is shown a modified rotary knife cutting machine, generally designated by the reference numeral 210, which embodies further features of the present invention. In this embodiment, the machine 210 includes a machine frame 212 having front and rear rails 214, 216 which are part of the machine frame and include the usual end castings.

Extending longitudinally of the machine frame 212 is a single roll-supporting and turning arrangement which includes a stationary main shaft 218 and an associated rotatable chuck (not shown). As previously described, this roll-supporting shaft 218 is adapted to receive a roll of material $R_1$ which is found on a core $C_1$.

Pivotally mounted on the machine frame 212 is a knife or cutting assembly, generally designated by the reference numeral 220, which includes a knife carriage 222 mounted for longitudinal movement on the front and rear rails 214, 216. The knife assembly or cutting mechanism 220 includes a high speed rotary knife 224 having a peripheral cutting edge 224a. The rotary knife 224 is mounted on a horizontal knife shaft 226 which is journalled on a hub 228a formed at the upper end of a rockable knife carrier 228.

The rockable knife carrier 228 is pivotally mounted on the carriage 222 on a rocker shaft 230 such that the rotary knife 224 may be rocked between the retracted position (illustrated in the full lines in FIG. 7) and the advanced or cutting position (illustrated by the broken lines in FIG. 7) wherein the peripheral cutting edge 224a has cut through the roll $R_1$ and the core $C_1$. The rocker shaft 230 is journalled on the carriage by any appropriate bearing arrangement, as more fully described and illustrated in U.S. Patent No. 3,161,097. A handle 232 is operatively connected to the rockable knife carrier 228 to enable manual manipulation of the knife between the illustrated positions.

Rotary movement is imparted to the knife 224 from a knife motor 234 which is mounted on the machine frame 212 and carries a driving sprocket 236 on its motor shaft 234a. The driving sprocket 236 is coupled via chain 238 to a driven sprocket 240 secured to the rocker shaft 230. The rocker shaft 230 further carries an additional sprocket which is coupled by chain 242 to a knife-driving sprocket 244 secured to the knife shaft 226. The aforesaid arrangement for rockably mounting the knife 224 and imparting drive thereto is typical of the machines made by applicant's assignee, as exemplified by the aforesaid patents.

In this illustrative embodiment, the grinding or sharpening mechanism, which is generally designated by the reference numeral 246, is rockably mounted to move in operative relation to the rotary knife 224 for sharpening the same. A similar program control as heretofore described in conjunction with FIG. 6, is provided for periodically rocking the grinding mechanism 246 out of operative relation to the rotary knife 224 for disabling the grinding mechanism which, as previously described, will continue to move with the rotary knife through its cutting cycle. Specifically, the grinding mechanism 246 includes a grinding motor 248 having the usual grinding wheel on its motor shaft which engages the bevelled cutting edge 224a of the rotary knife 224. The grinder motor 248 in turn is mounted on a grinder carrier 250 which is pivotally mounted on the rocker shaft 230 such that it may move in unison with the knife carrier 228 and periodically be displaced relative thereto.

As before, provision is made for initially adjusting the position of the grinder carrier 250 relative to knife carrier 228 such that the grinding wheel may be brought into engagement with the bevelled cutting edge 224a of the rotary knife 224 for sharpening the same and to also enable readjustment of the normal operative position of the grinding mechanism 246 relative to the knife as the latter decreases in diameter incident to sharpening. To this end, a right angle mounting bracket 252 is pivotally supported on the grinder carrier 250 and a similar mounting bracket 254 is pivotally supported on the knife carrier 228. Specifically, and as seen best in FIG. 8, mounting bracket 252 has a pivot pin 256 extending through the leg 252a thereof while mounting bracket 254 has a similar pin 258 extending through the leg 254a thereof. Straddling the mounting brackets 252, 254 is a grinder-positioning shaft 260 which extends through the legs 252b, 254b of the mounting brackets 252, 254. The grinder-positioning shaft 260 has a threaded intermediate section 260a which extends through a corresponding tapped hole 252c in bracket 252. At one end the shaft 260 carries a hand wheel 262 and at its other end the shaft is provided with an actuating arrangement for periodically backing off the grinding mechanism 246 relative to the cutting mechanism 220. Specifically, and as seen best in FIG. 7, a cylinder 264 is pivotally supported at pivot 266 on the leg or base 254a of the bracket 254 and extends generally at right angles to the grinder-positioning shaft 260. The cylinder receives a double-acting piston, with the piston rod 268 being pivotally connected to a threaded actuating member 270 loosely mounted on shaft 260 between the coupling collars 272, 274. As before, the actuating member 270 is provided with an internal through bore 270a and an external lead lead screw 270b which is engaged within the corresponding tapped hole 254c and bracket 254. Thus, upon selective application of pressure and porting of the double-acting cylinder and piston 264, 268, the necessary motion is imparted to the actuating member 270 to rock the grinder carrier 250 relative to the knife carrier 228 to move the grinder into and out of engaging relation to the rotary knife 224.

Although the first embodiment of the invention described in conjunction with FIGS. 1 through 6 illustrates both the cutting and grinding mechanisms slidably mounted and slidable relative to each other and the second embodiment described in conjunction with FIGS. 7 and 8 illustrates both the cutting and grinding mechanisms as being rockable as a unit, with the grinding mechanism being rockable away from the cutting mechanism to disable the same, it should be appreciated that the grinding mechanism could be rocked out of operative relation in the first embodiment and the grinding mechanism could be slid out of operative relation in the second embodiment.

In both embodiments, the grinding mechanism is capable of moving with the cutting mechanism throughout the entire cutting cycle and may be selectively brought into and out of operative relation to the rotary knife for sharpening the same. Additionally, provision is made for adjusting the spatial relationship between the grinding mechanism and the cutting mechanism in the first instance to compensate for changes in knife diameter. Although one specific form of program control has been disclosed, it will be appreciated by those skilled in the art that various types of controls may be employed to bring about the relative displacement between the cutting and grinding mechanisms in the two illustrative embodiments.

A latitude of modification, change and substitution is intended in the foregoing disclosure, and in certain instances some features of the invention will be used without a corresponding use of other features. Accordingly, it is appropriate that the invention be construed in accordance with the appended claims.

What I claim is:

1. In a rotary knife cutting machine, a frame, roll-supporting means mounted on said frame and adapted to receive at least one roll of material to be slit, a cutting mechanism including a rotary knife mounted on said frame for movement through a cutting cycle relative to said roll-supporting means, grinding mechanisms mounted on said cutting mechanisms in operative relation to said rotary knife such that said grinding mechanisms will move with said rotary knife and sharpen the same, and means for periodically moving said grinding mechanisms out of operative relation to said rotary knife such that said grinding mechanisms will continue to move with said rotary knife but will be ineffective to sharpen the same.

2. In a rotary knife cutting machine, a frame, roll-supporting means mounted on said frame and adapted to receive at least one roll of material to be slit, a cutting mechanism including a rotary knife slidably mounted on said frame for reciprocatory movement through a cutting cycle relative to said roll-supporting means, grinding mechanisms slidably mounted on said cutting mechanisms and normally disposed in operative relation to said rotary knife such that said grinding mechanisms will move with said rotary knife and sharpen the same, and programmed control means for periodically moving said grinding mechanisms out of operative relation to said rotary knife such that said grinding mechanisms will continue to move with said rotary knife but will be ineffective to sharpen the same.

3. In a rotary knife cutting machine, a frame, roll-supporting means mounted on said frame and adapted to receive at least one roll of material to be slit, a cutting mechanism including a rotary knife pivotally mounted on said frame for rocking movement through a cutting cycle relative to said roll-supporting means, grinding mechanisms pivotally mounted on said cutting mechanisms and normally disposed in operative relation to said rotary knife such that said grinding mechanisms will move with said rotary knife and sharpen the same, and programmed control means for periodically moving said grinding mechanisms out of operative relation to said rotary knife such that said grinding mechanisms will continue to move with said rotary knife but will be ineffective to sharpen the same.

4. In a rotary knife cutting machine, a frame, roll-supporting means mounted on said frame and adapted to receive at least one roll of material to be slit, a cutting mechanism including a rotary knife mounted on said frame for movement through a cutting cycle relative to said roll-supporting means, a grinder, means including a grinder carrier mounting said grinder on said cutting mechanisms in engaging relation to said rotary knife such that said grinder will move with said rotary knife and sharpen the same, means operatively connected to said grinder carrier for adjusting the same to a normal operative position in dependence upon the diameter of said rotary knife, and means for periodically moving said grinder carrier out of said normal operative position and said grinder out of engaging relation to said rotary knife such that said grinder will continue to move with said rotary knife but will be ineffective to sharpen the same.

5. In a rotary knife cutting machine, a frame, roll-supporting means mounted on said frame and adapted to receive at least one roll of material to be slit, a cutting mechanism including a rotary knife slidably mounted on said frame for reciprocatory movement through a cutting cycle relative to said roll-supporting means, a grinder, means including a grinder carrier mounting said grinder on said cutting mechanisms in engaging relation to said rotary knife such that said grinder will move with said rotary knife and sharpen the same, means operatively connected to said grinder carrier for adjusting the same to a normal operative position in dependence upon the diameter of said rotary knife, and means for periodically moving said grinder carrier out of said normal operative position and said grinder out of engaging relation to said rotary knife such that said grinder will continue to move with said rotary knife but will be ineffective to sharpen the same.

6. In a rotary knife cutting machine, a frame, roll-supporting means mounted on said frame and adapted to receive at least one roll of material to be slit, a cutting mechanism including a rotary knife mounted on said frame for movement through a cutting cycle relative to said roll-supporting means, a grinder, means including a grinder carrier pivotally mounting said grinder on said cutting mechanism in engaging relation to said rotary knife such that said grinder will move with said rotary knife and sharpen the same, means operatively connected to said grinder carrier for pivotally adjusting the same to a normal operative position in dependence upon the diameter of said rotary knife, and means for periodically moving said grinder carrier out of said normal operative position and said grinder out of engaging relation to said rotary knife such that said grinder will continue to move with said rotary knife but will be ineffective to sharpen the same.

7. In a rotary knife cutting machine, a frame, roll-supporting means mounted on said frame and adapted to receive at least one roll of material to bet slit, a cutting mechanism including a rotary knife mounted on said frame for movement through a cutting cycle relative to said roll-supporting means, a grinder, means mounting said grinder on said cutting mechanisms in operative relation to said rotary knife such that said grinder will move with said rotary knife and sharpen the same, and means for periodically displacing said grinder and rotary knife relative to each other such that said grinder will continue to move with said rotary knife but will be ineffective to sharpen the same.

8. In a rotary knife cutting machine, a frame, at least one stationary shaft adapted to receive a roll of material, a chuck adapted to engage said roll for rotating the same about said main shaft, a knife carrier, a rotary knife, means operatively connected to and mounting said rotary knife on said knife carrier for rotary movement about a knife axis, a drive on said knife carrier for rotating said rotary knife about said knife axis, means mounting said knife carrier for movement relative to said stationary shaft such that said rotary knife may be moved through a cutting cycle, a grinder carrier movably mounted on said knife carrier, a grinder on said grinder carrier and arranged to move with said rotary knife through said cutting cycle in grinding relation thereto and control means operatively connected to said grinder carrier for periodically displacing said grinder carrier and said knife carrier relative to each other for disrupting grinding during controlled intervals.

9. In a rotary knife cutting machine, a frame, at least one stationary shaft adapted to receive a roll of material, a chuck adapted to engage said roll for rotating the same about said main shaft, a knife carrier, a rotary knife, means operatively connected to and mounting said rotary knife on said knife carrier for rotary movement about a knife axis, a drive on said knife carrier for rotating said rotary knife about said knife axis, means mounting said knife carrier for sliding movement on said frame relative to said stationary shaft such that said rotary knife may be reciprocated through a cutting cycle, a grinder carrier slidably mounted on said knife carrier, a grinder on said grinder carrier and arranged to move with said rotary knife through said cutting cycle in grinding relation thereto and control means operatively connected to said grinder carrier for periodically displacing said grinder carrier relative to said knife carrier to move said grinder out of grinding relation to said rotary knife for disrupting grinding during controlled intervals.

10. In a rotary knife cutting machine, a frame, at least one stationary shaft adapted to receive a roll of material, a chuck adapted to engage said roll for rotating the same about said main shaft, a knife carrier, a rotary knife, means operatively connected to and mounting said rotary knife on said knife carrier for rotary movement about a knife axis, a drive on said knife carrier for rotating said rotary knife about a knife axis, means mounting said knife carrier on said frame for pivotal movement relative to said stationary shaft such that said rotary knife may be swung back and forth through a cutting cycle, a grinder carrier pivotally mounted on said knife carrier, a grinder on said grinder carrier and aranged to move with said rotary knife through said cutting cycle in grinding relation thereto and control means operatively connected to said grinder carrier for peridically displacing said grinder carrier relative to said knife carrier to move said grinder out of grinding relation to said rotary knife for disrupting grinding during controlled intervals.

11. In a rotary knife cutting machine, a frame, roll-supporting means mounted on said frame and adapted to receive at least one roll of material to be slit, a cutting mechanism including a rotary knife mounted on said frame for movement through a cutting cycle relative to said roll-supporting means, a grinder, means including a grinder carrier mounting said grinder on said cutting mechanisms in engaging relation to said rotary knife such that said grinder will move with said rotary knife and sharpen the same and means operatively connected to said grinder carrier for adjusting the same to a normal operative position in dependence upon the diameter of said rotary knife, said grinder carrier being movable out of said normal operative position and said grinder out of engaging relation to said rotary knife such that said grinder will continue to move with said rotary knife but will be ineffective to sharpen the same.

No references cited.

WILLIAM W. DYER, Jr., *Primary Examiner.*

HARRISON L. HINSON, *Examiner.*